Jan. 5, 1971          K. V. MATTHEWS          3,553,580
SCALING CIRCUIT FOR ANALOG VOLTAGE SIGNAL MEASURING INSTRUMENTS
Filed Feb. 28, 1968
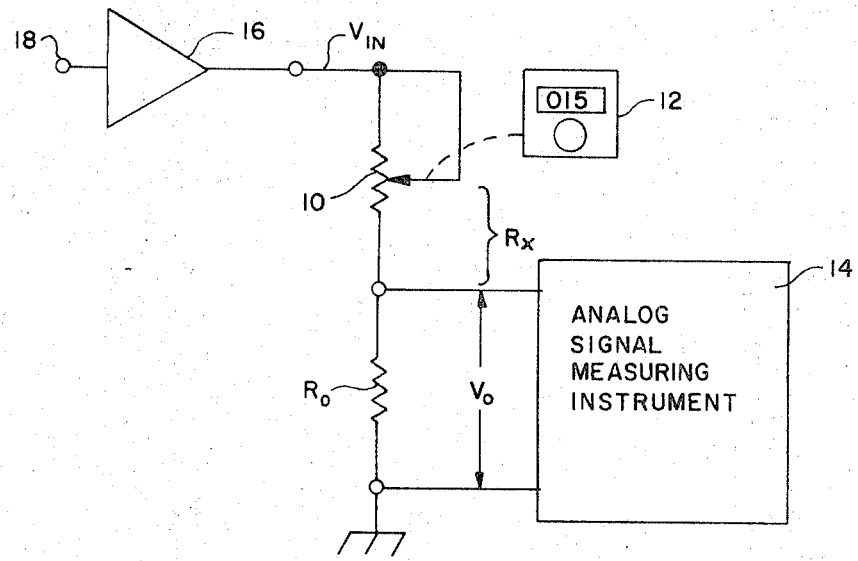
INVENTOR.
KENNETH V. MATTHEWS
BY Paul R. Harder
ATTORNEY 3,553,580
SCALING CIRCUIT FOR ANALOG VOLTAGE
SIGNAL MEASURING INSTRUMENTS
Kenneth V. Matthews, Garden Grove, Calif., assignor to
Beckman Instruments, Inc., a corporation of California
Filed Feb. 28, 1968, Ser. No. 709,083
Int. Cl. G01r 15/08
U.S. Cl. 324—115                                    3 Claims

ABSTRACT OF THE DISCLOSURE

A scale circuit for use with an analog voltage signal measuring instrument is disclosed which provides a continuously variable scaling factor. The circuit includes a linearly variable impedance $R_x$ and a second impedance $R_0$ connected as a potential divider for receiving the signal to be measured. A linear indicating device is connected to the variable impedance such that it indicates the function $$\frac{R_x}{R_0}+1$$

If the signal developed across the impedance $R_0$ is connected to the measuring instrument the indication on the indicating device is the scaling factor.

---

This invention relates to analog voltage signal measuring instruments and more particularly to a variable scaling circuit therefor which provides a continuously variable scaling factor.

In most analog voltage signal measuring instruments it is the usual practice to provide a multiplicity of signal ranges represented by full scale deflection of the indicator. For example, a 100 millivolt recorder, i.e., a recorder requiring an input signal of 100 millivolts to drive the pen to full scale, may be provided with the voltage spans of 0 to 0.1, 0 to 1.0 and 0 to 3.0 volts. A switch will usually be provided on the recorder bearing the indications ×1, ×10 and ×30, these numbers representing the scaling factor or the factor by which the indicator reading must be multiplied to obtain the actual value of the measured signal. The scaling factor selector switch in the foregoing example would be connected in such a manner as to apply the measured input signal directly to the recorder pen drive circuit in the ×1 position. This would mean that the maximum signal which may be measured for this particular setting is 100 millivolts and the scale is read directly. In the ×10 position a 10 to 1 potential divider would be interposed in the circuit and the recorder would be capable of measuring signal levels between 0 and 1 volt and the actual reading of the recorder is multiplied by 10 to obtain the actual value of the measured signal. Likewise, in the ×30 position a 30 to 1 potential divider would be added to the circuit, the maximum signal that could be measured would be 3.0 volts and the recorder reading would be multiplied by 30 to obtain the actual measured signal value.

In some applications it is desirable to provide a continuously variable scaling factor such that the measuring instrument will provide a full scale reading for any desired input signal. In this case the variable maximum input voltage, $V_{in.\ max.}$ must be multiplied by a factor "$x$" to equal the signal required to drive the measuring instrument to full scale, $V_{fs}$, i.e.:

$$V_{in.\ max.} \cdot x = V_{fs} \quad (1)$$

which will be recognized to be of the form $xy=k$, the equation of the equilateral hyperbola.

If this is to be done across a potential divider the required divider function $$x=\frac{V_{fs}}{V_{in.\ max.}} \quad (2)$$

is therefore a hyperbolic function.

This may be accomplished by providing a linear scale on a hyperbolically wound potentiometer which will produce the desired continuously variable scaling factor. This, however, is an expensive solution. A linear potentiometer with a non-linear scale could be utilized but is impractical.

It is, therefore, a principal object of this invention to provide a scaling circuit for use with an analog voltage signal measuring instrument which is inexpensive, simple in construction, yet provides the required hyperbolic divider function and in which the scaling factor may be read directly.

The drawing illustrates an electrical schematic diagram of one preferred embodiment of the invention.

Referring now to the drawing, there is illustrated a scaling device including a linear potential divider and a linear indicating device. The potential divider consists of a linearly variable impedance 10 in the form of a potentiometer having its slider connected to and driven by a linear indicating device 12 which may conveniently take the form of a linear turns counting dial. Connected in series with the variable impedance 10 is a second impedance $R_0$ in the form of a fixed resistor. The voltage signal developed across the impedance $R_0$ is connected to the input of an analog voltage signal measuring device 14 which may be of any desirable form such as a recorder, meter, digital voltmeter or the like.

The ratio of the signal developed across the impedance $R_0$ to the input signal $V_{in}$ is $$\frac{V_{fs}}{V_{in}}=\frac{R_0}{R_0+R_x} \quad (3)$$

or $$V_{fs}=\left(\frac{R_0}{R_0+R_x}\right)V_{in} \quad (4)$$

It is apparent from Equation 3 that the divider function $$\frac{R_0}{R_0+R_x} \quad (5)$$

for uniform changes in $V_{in}$, is hyperbolic, the divider function required by Equation 2 to provide a continuously variable scaling factor. Since the voltage signal $V_0$ developed across impedance $R_0$ is applied directly to the analog voltage signal measuring instrument the maximum variable input signal $V_{in.\ max.}$ required to drive the measuring instrument to full scale deflection is $$V_{in\ max.}=\left(\frac{R_x}{R_0}+1\right)V_{fs} \quad (6)$$

and the scaling factor SF is $$SF=\frac{V_{in\ max.}}{V_{fs}}=\frac{R_x}{R_0}+1 \quad (7)$$

If now the indicating device is connected to the slider of linear potentiometer 10 such that it indicates, for all values of $R_x$, the function $$\frac{R_x}{R_0}+1 \quad (8)$$

the scaling factor may be read directly from the indicating device. This may readily be accomplished by selecting a linear indicating device which is matched to a linear potentiometer in such a manner that for every integer multiple of 1 the slider is moved so that the change in $R_x$ is equal to $R_0$ and is affixed to the slider such that the indicator reads 1.0 when $R_x$ equals 0. The dial reading then will always indicate the function of Equation 7 which is the scaling factor by which the reading of the measuring device must be multiplied to obtain the actual analog voltage signal being measured.

As a specific example of the foregoing scaling device, assume that the input signal is to be measured on a 100 millivolt recorder, $R_0$ equals 1,000 ohms, the potentiometer 10 is a 30,000 ohm three-turn potentiometer and the indicating device is a three-turns counting dial.

The maximum ratio of $R_x/R_0$ will determine the position of the decimal point upon the turns counting indicator. In the example given since the maximum ratio is 30 and since the indicating device illustrated in the drawing is a three-turn device calibrated to read the turns to the nearest hundredth turn, the position of the decimal point will be shifted one place to the right, i.e. the tenths reading on the dial will become the units reading of the scaling factor. In other words as illustrated in the drawing, the dial would normally be read as 0.15 turn but when coupled to a potential divider wherein the maximum ratio of $R_x$ to $R_0$ is 30 will read 01.5. Thus one tenth of a turn of the dial represents one unit of the scaling factor. With a 30,000 ohm three-turn potentiometer and a three-turn dial, it is apparent that for every tenth of a turn of the dial, the change in $R_x$ is 1,000 ohms, the value of $R_0$. If now the slider of potentiometer 10 is positioned such that $R_x$ is 0, the dial set to read 010 and the slider then coupled to the turns counting dial, it will be apparent that for all values of $R_x$ the dial reading indicates the value of Equation 7. When the dial is set at 010, $R_x$ is 0 and a 100 millivolt input signal will drive the recorder to full scale. When the dial is rotated to read 020, $R_x$ equals $R_0$, i.e., 1,000 ohms has been added into the circuit. We now have a 2 to 1 potential divider and a 200 millivolts input is required to drive the recorder to full scale. When the dial reads 100 the factor $R_x/R_0$ is 9 and the input signal required to drive the recorder to full scale is 1.0 volt. It will be apparent that for the specific example illustrated the recorder may be calibrated to read full scale for any input signal between the values of 100 millivolts and 3.0 volts, i.e., the scaling factor is continuously variable between 0 and 30.

To maintain a high degree of accuracy it is essential that the scaling device be driven from a very low impedance source. For this reason, it may be desirable to couple between the input to the scaling device and the signal being measured, a voltage source amplifier 16 having an extremely low output impedance to avoid errors resulting from loading as the overall resistance of the device changes. This may readily be accomplished by interposing a simple transistor emitter-follower amplifier utilizing a power transistor in the output stage.

It should be completely apparent that the scaling device of the present invention may be utilized as an accessory to any analog voltage signal measuring instrument or may be incorporated in the measuring instrument as an integral part thereof. It is also obvious that the scaling device may, if desired, incorporate the voltage signal amplifier 16 as an integral part in which case terminal 18 and circuit ground would become the input terminals to the scaling device or the actual input terminals of the measuring instrument if the entire circuit is incorporated in an integral measuring instrument.

Although the impedance $R_0$ has been illustrated as fixed in the preferred embodiment in some cases it may be desirable to provide a variable or switchable impedance in series with the potentiometer to provide more flexibility in selecting the maximum ratio of $R_x/R_0$. Constructed appropriately a variation in $R_0$ will not affect the coupling between the turns counting dial and the potentiometer but will merely shift the decimal position to the right or left. For example if a 100 ohm resistance were substituted in the example above the maximum acceptable input signal would be 30 volts and the dial would read the scaling factor from 0 to 300 to the nearest unit.

While the invention has been described herein in connection with a single preferred embodiment and a single specific example has been given, it should be understood that various modifications and variations may be made therein by those skilled in the art.

I claim:

1. A scaling device for use with an analog voltage signal measuring instrument having a given maximum acceptable signal level to provide a full scale reading comprising:
   a potential divider adapted to be connected to an analog voltage signal to be measured, said divider including a linearly variable impedance $R_x$ and a second impedance $R_0$;
   output means connected across said second impedance for connecting the analog voltage signal developed across said second impedance to the input of an analog voltage signal measuring instrument;
   a linear indicating means connected to said variable impedance, said indicating means affixed to said variable impedance such that the indication thereon equals a decimal multiple of $$\frac{R_x}{R_0}+1$$

whereby the value indicated by said indicating means times the maximum acceptable signal level of said measuring instrument represents the input signal level to said scaling device required to drive said measuring instrument to full scale deflection.

2. A scaling device for use with an analog voltage signal measuring instrument having a maximum acceptable signal level $V_{fs}$ to provide full scale deflection of the measuring instrument comprising:
   a potential divider adapted to be connected to an analog signal $V_{in.}$ to be measured, said divider including a linearly variable impedance $R_x$ and a second impedance $R_0$;
   a linear indicating means connected to said variable impedance to provide an indication of the value of $$\frac{R_x}{R_0}+1$$

for all values of $R_x$;
   means for connecting the signal developed across said second impedance to said measuring instrument whereby said indication on said indicating means represents the ratio to the analog signal $V_{in.}$ required to drive said measuring instrument to full scale of $V_{fs}$.

3. In an analog voltage signal measuring instrument a continuously variable scaling circuit comprising:
   a potential divider including a linearly variable impedance $R_x$ and a second impedance $R_0$;
   a linear indicating means connected to said variable impedance and providing an indication of the value of $$\frac{R_x}{R_0}+1$$

for all values of $R_x$ whereby said indicating means indicates the scaling factor of said measuring instrument.

References Cited

UNITED STATES PATENTS

| | | | |
|---|---|---|---|
| 1,772,217 | 8/1930 | Heyer | 324—115X |
| 2,881,295 | 4/1959 | Brown | 338—196X |
| 2,935,368 | 5/1960 | Moseley | 324—115X |

ALFRED E. SMITH, Primary Examiner